United States Patent
Hwang et al.

(10) Patent No.: US 8,577,303 B2
(45) Date of Patent: Nov. 5, 2013

(54) APPARATUS AND METHOD FOR TRANSMITTING CHANNEL SOUNDING SIGNAL IN WIRELESS COMMUNICATION SYSTEM

(75) Inventors: Keun-Chul Hwang, Seongnam-si (KR); Sung-Ho Lee, Seoul (KR); Soon-Young Yoon, Seoul (KR); In-Kyu Lee, Seoul (KR); Seok-Hwan Park, Hanam-si (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 954 days.

(21) Appl. No.: 12/012,382

(22) Filed: Jan. 31, 2008

(65) Prior Publication Data

US 2008/0188186 A1 Aug. 7, 2008

(30) Foreign Application Priority Data

Feb. 5, 2007 (KR) .................. 10-2007-0011488
Aug. 7, 2007 (KR) .................. 10-2007-0078907

(51) Int. Cl.
*H04B 1/00* (2006.01)
(52) U.S. Cl.
USPC ........ 455/69; 455/13.3; 455/63.4; 455/67.11; 455/101; 455/575.7; 370/332; 370/334; 375/267; 375/299; 375/315

(58) Field of Classification Search
None
See application file for complete search history.

(56) References Cited

U.S. PATENT DOCUMENTS

| 2002/0173302 | A1* | 11/2002 | Baker et al. ................... 455/422 |
| 2003/0104796 | A1* | 6/2003 | Yoon ......................... 455/277.2 |
| 2003/0125002 | A1* | 7/2003 | Harrison .................... 455/277.1 |
| 2003/0125040 | A1* | 7/2003 | Walton et al. ................ 455/454 |
| 2004/0235529 | A1* | 11/2004 | Tarokh et al. .............. 455/562.1 |
| 2005/0180360 | A1* | 8/2005 | Hansen et al. ................ 370/334 |
| 2005/0281322 | A1* | 12/2005 | Lee et al. ..................... 375/146 |
| 2006/0270343 | A1* | 11/2006 | Cha et al. ....................... 455/25 |
| 2007/0096876 | A1* | 5/2007 | Bridgelall et al. .......... 340/10.1 |

FOREIGN PATENT DOCUMENTS

| KR | 10-2005-0120441 | 12/2005 |
| KR | 1020060071321 A | 6/2006 |
| KR | 10-0701315 | 3/2007 |
| KR | 10-0712070 | 4/2007 |

* cited by examiner

*Primary Examiner* — Zhiyu Lu (57) ABSTRACT

Provided is an apparatus and method for transmitting a channel sounding signal from a user terminal in a multiple antenna system. In the method, a channel for each of a plurality of antennas is estimated. The receiving signal power of each of the antennas is calculated using the channel information obtained through the channel estimation. The antenna with the highest RX signal power is selected. Therefore, it is possible to enhance the signal reception performance of the user terminal.

21 Claims, 4 Drawing Sheets

APPARATUS AND METHOD FOR TRANSMITTING CHANNEL SOUNDING SIGNAL IN WIRELESS COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Feb. 5, 2007 and allocated Serial No. 2007-11488, and an application filed in the Korean Intellectual Property Office on Aug. 7, 2007 and allocated Serial No. 2007-78907, the contents of which are incorporated herein by reference.

TECHNICAL FIELD OF THE INVENTION

The present invention relates generally to an apparatus and method for transmitting a channel sounding signal in a wireless communication system, and in particular, to an apparatus and method for transmitting a channel sounding signal in a multiple antenna system based on a Time Division Duplex (TDD) scheme.

BACKGROUND OF THE INVENTION

A variety of multimedia services in wireless environments are required due to the rapid growth of the mobile communication market. Large-capacity data must be transmitted at a high speed in order to provide the multimedia services. Thus, research is being conducted on a multiple antenna system (e.g., a Multiple Input, Multiple Output (MIMO) system) for efficient use of limited frequency resources.

MIMO schemes for the multiple antenna system can be classified into an open-loop MIMO scheme and a closed-loop MIMO scheme depending on whether a transmitting side detects channel information. In the open-loop MIMO scheme, a transmitting side transmits data without knowing channel information. Examples of the open-loop MIMO scheme include a Space-Time Coding (STC) scheme and a Vertical-Bell Labs lAyered Space-Time (V-BLAST) scheme. In the closed-loop MIMO scheme, a transmitting side acquires channel information and transmits data using the acquired channel information. Examples of the closed-loop MIMO scheme include a Singular Value Decomposition (SVD) scheme and a Space Division Multiple Access (SDMA) scheme.

When the multiple antenna system uses the closed-loop MIMO scheme, a method for acquiring channel information by a transmitting side varies depending on the duplexing schemes of the multiple antenna system. For example, when the multiple antenna system uses a Frequency Division Duplex (FDD) scheme, a receiving side measures a channel through a signal received from a transmitting side and feeds the measured channel value back to the transmitting side. Thus, the transmitting side can acquire channel information. On the other hand, when the multiple antenna system uses a Time division Duplex (TDD) scheme, each of receiving sides transmits a channel sounding signal for discrimination between the receiving sides to a transmitting side. Then the transmitting side measures an uplink channel through the channel sounding signal and uses the measured uplink channel value as information about a downlink channel. This is based on the channel reciprocity property that the uplink and downlink channels are equal to each other.

In the multiple antenna system, a base station and a user terminal each have a plurality of antennas. The user terminal can receive signals through a plurality of receiving (RX) antennas, thereby achieving a diversity gain. Also, the base station can transmit a plurality of streams to a user terminal through a plurality of transmitting (TX) antennas, thus increasing the data transmission rate of the user terminal. However, in general, the user terminal uses only one TX antenna in a TX mode because it has a limited battery life and thus must transmit a signal at a much lower TX power than the base station. That is, the user terminal uses all of the antennas in an RX mode but uses only one of the antennas in a TX mode. Thus, when the multiple antenna system uses the closed-loop MIMO scheme, a user terminal transmits a channel sounding signal to a base station through only one TX antenna. In this case, the base station cannot acquire information about the entire downlink channel for the user terminal. This may reduce the data reception rate of the user terminal.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an apparatus and method for transmitting a channel sounding signal in a multiple antenna system.

Another object of the present invention is to provide an apparatus and method for enabling a user terminal to select an antenna for transmission of a channel sounding signal in a multiple antenna system on the basis of the power of a signal received through each antenna.

Still another object of the present invention is to provide an apparatus and method for performing a scheduling operation in a multiple antenna system by using channel sounding signals received from user terminals.

According to one aspect of the present invention, a method for transmitting a channel sounding signal from a user terminal in a multiple antenna system includes: estimating a channel for each of a plurality of antennas; calculating the RX signal power of each of the antennas by using the channel information obtained through the channel estimation; and selecting the antenna with the highest RX signal power.

According to another aspect of the present invention, an apparatus for transmitting a channel sounding signal from a user terminal in a multiple antenna system includes: a channel estimator for estimating a channel for each of a plurality of antennas; an RX signal power calculator for calculating the RX signal power of each of the antennas by using the channel information obtained through the channel estimation; and an antenna selector for selecting the antenna with the highest RX signal power.

According to still another aspect of the present invention, a method for transmitting data from a base station in a multiple antenna system includes: receiving a channel sounding signal transmitted from user terminals through an antenna with the highest RX signal power among a plurality of user terminal antennas; estimating a channel between a channel sounding signal transmitting antenna of each user terminal and base station antennas by using the received channel sounding signal from each user terminal; and calculating a beamforming weight for each user terminal by using the channel information of each antenna obtained through the channel estimation.

According to even another aspect of the present invention, an apparatus for transmitting data from a base station in a multiple antenna system includes: a TX and RX switch for receiving a channel sounding signal transmitted from user terminals through an antenna with the highest RX signal power among a plurality of user terminal antennas; a channel estimator for estimating a channel between a channel sounding signal transmitting antenna of each user terminal and base station antennas by using the received channel sounding signal from each user terminal; and a beamforming controller for calculating a beamforming weight for each user terminal by using the channel information of each antenna obtained through the channel estimation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide a scheme for transmitting a channel sounding signal in a multiple antenna system.

In the following description, a multiple antenna system includes a base station with $M_t$ antennas and a user terminal with $M_r$ antennas. The user terminal receives signals through the $M_r$ antennas and transmits signals through the N (smaller than $M_r$) antennas. The following description is made on the assumption that the user terminal has two antennas and transmits signals through one TX antenna. However, it is to be clearly understood that the present invention is also applicable to any case where the user terminal has a plurality of antennas and transmits signals through TX antennas fewer than the plurality of antennas.

Also, the following description is made on the assumption that the multiple antenna system uses a beamforming technique. However, it is to be clearly understood that the present invention is also applicable to any other multiple antenna system that uses a preceding technique. Furthermore, the present invention is not limited to a closed-loop MIMO scheme. Also, the following description is made in the context of a TDD multiple antenna system, to which the present invention is not limited. Thus, it is to be clearly understood that the present invention is also applicable to any other communication system such as an Orthogonal Frequency Division Multiplexing (OFDM) and Orthogonal Frequency Division Multiple Access (OFDMA) system.

Figure 1:
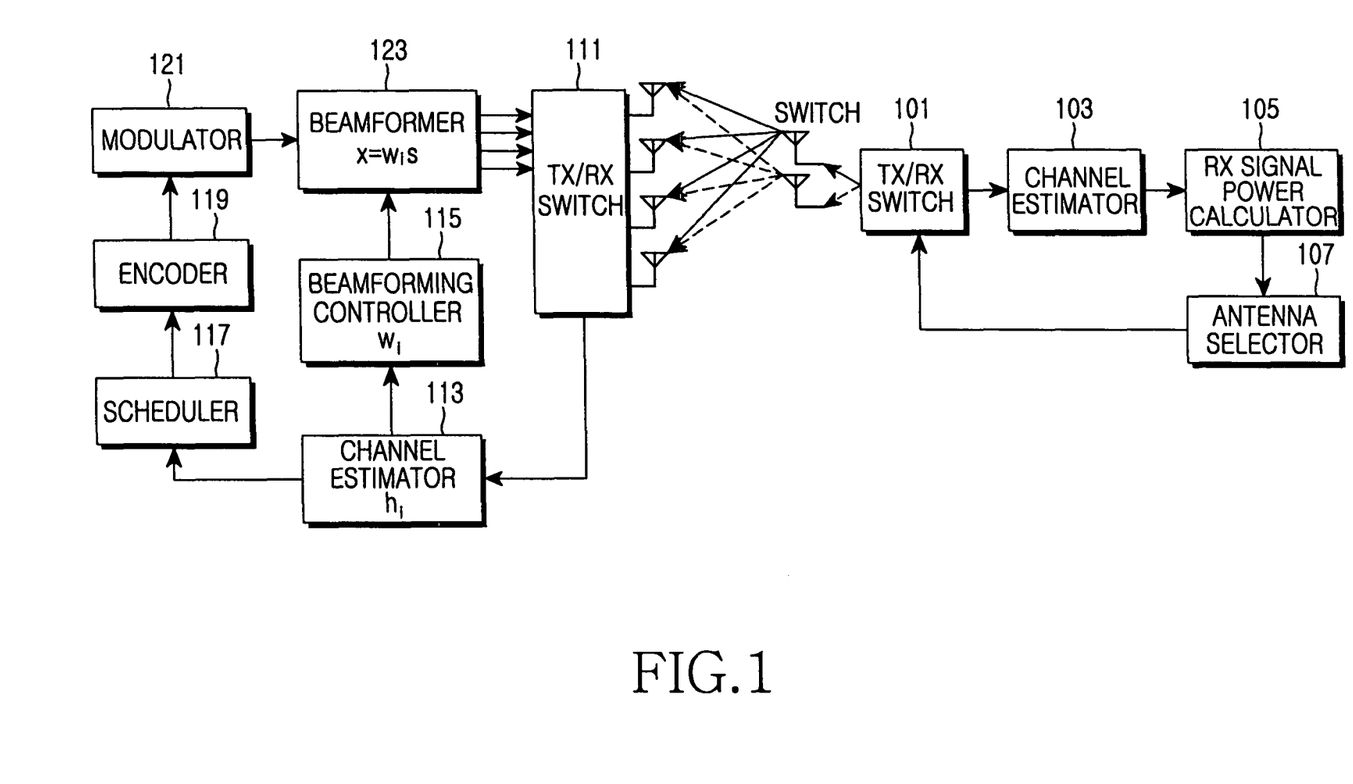
FIG. 1 is a block diagram of a multiple antenna system using a beamforming technique according to the present invention.

FIG. 1 is a block diagram of a multiple antenna system using a beamforming technique according to the present invention.

Referring to FIG. 1, the multiple antenna system includes a base station with a plurality of antennas and a user terminal with a plurality of antennas. The user terminal includes a TX/RX switch 101, a channel estimator 103, an RX signal power calculator 105, and an antenna selector 107. The base station includes a TX/RX switch 111, a channel estimator 113, a beamforming controller 115, a scheduler 117, an encoder 119, a modulator 121, and a beamformer 123.

First, a detailed description will be given of the configuration of the user terminal. Based on the TDD scheme, the TX/RX switch 101 receives signals from the base station through the antennas during a downlink period and transmits signals to the base station through some of the antennas during an uplink period. Also, using a sounding channel allocated by the base station, the TX/RX switch 101 transmits a channel sounding signal to the base station through the antenna selected by the antenna selector 107 during the uplink period.

The channel estimator 103 estimates a channel for each antenna by using a downlink signal received from the TX/RX switch 101. For example, the channel estimator 103 estimates a channel for each antenna by using a pilot signal included in the downlink signal.

The RX signal power calculator 105 calculates the RX signal power of each antenna by using the estimated channel information received from the channel estimator 103.

The antenna selector 107 selects the antenna with the highest RX signal power by comparing the calculated RX signal power levels of the respective antennas received from the RX signal power calculator 105. For example, the antenna selector 107 selects the antenna with the best Signal-to-Noise Ratio (SNR) in order to transmit an uplink signal through the antenna with the best downlink channel condition.

Next, a detailed description will be given of the configuration of the base station. Based on the TDD scheme, the TX/RX switch 111 transmits signals received from the beamformer 123 to user terminals located in a service area through the antennas during a downlink period and receives signals from the user terminals through the antennas during an uplink period. In particular, using a sounding channel allocated to the user terminals, the TX/RX switch 111 receives a channel sounding signal from the user terminals during the uplink period. Herein, each of the user terminals selects the best antenna for transmission of the channel sounding signal and transmits the channel sounding signal through the selected antenna.

The channel estimator 113 estimates a channel between each antenna of the base station and the channel sounding signal transmitting antenna of each user terminal by using the channel sounding signal of each user terminal received from the TX/RX switch 111.

The beamforming controller 115 calculates a beamforming weight of each user terminal by using the channel information of each user terminal received from the channel estimator 113.

Using the channel information of the user terminals received from the channel estimator 113, the scheduler 117 selects the user terminals to be provided with a service in the current frame among the user terminals located in the service area. For example, when a service is provided to k user terminals among N user terminals located in the service area, the scheduler 117 constructs user terminal sets of all possible combinations including the k user terminals among the N user terminals and selects the user terminal set to be provided with a service among the user terminal sets on the basis of the channel information of the user terminals received from the channel estimator 113, thereby selecting the user terminals to be provided with a service. Herein, the scheduler 117 selects the user terminal set using Equation 1:

$$\bar{p} = \underset{p \in P}{\arg\min}\, tr\!\left((H_p H_p^H)^{-1}\right), \qquad \text{[Eqn. 1]}$$

where $\bar{p}$ denotes the selected user terminal set, P denotes the user terminal set of all possible combinations including the k user terminals among the N user terminals located in the service area, $H_p$ denotes a matrix including the channel information of the user terminals included in the user terminal set, and tr( ) denotes a trace function for obtaining the sum of all diagonal elements of a matrix in ( ).

The encoder 119 encodes a signal, which is to be transmitted to the user terminals selected by the scheduler 117, at a predetermined modulation level (e.g., a predetermined Modulation and Coding Scheme (MCS) level).

The modulator 121 modulates the encoded signal, which is received from the encoder 119, at a predetermined modulation level.

The beamformer 123 copies the modulated signal, which is received from the modulator 121, for the corresponding antennas. Thereafter, the beamformer 123 multiplies the copied signals by the beamforming weights received from the beamforming controller 115, and outputs the resulting signals to the TX/RX switch 111.

Figure 2:
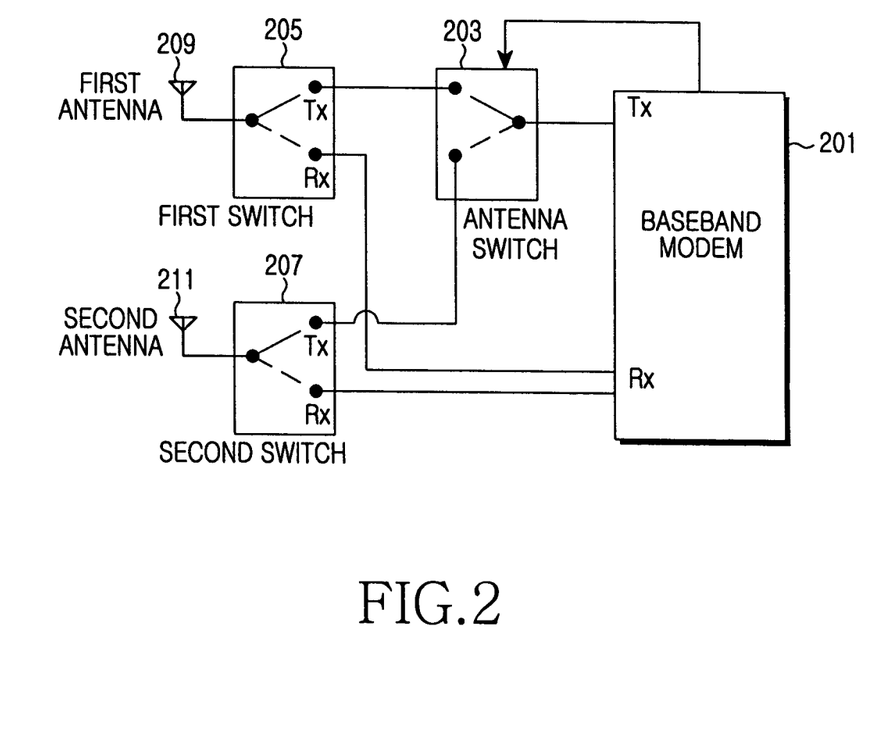
FIG. 2 is a block diagram of a TX/RX switch of a user terminal in the multiple antenna system according to the present invention.

FIG. 2 is a block diagram of the TX/RX switch of the user terminal in the multiple antenna system according to the present invention.

Referring to FIG. 2, the TX/RX switch of the user terminal includes an antenna switch 203, a first switch 205, a second switch 207, a first antenna 209, and a second antenna 211. The following description is made on the assumption that the first antenna 209 is used to both transmit and receive a data signal and the second antenna 211 is used to only receive a data signal.

A baseband modem 201 includes the channel estimator 103, the RX signal power calculator 105, and the antenna selector 107 that are illustrated in FIG. 1. That is, the baseband modem 201 selects the best antenna for transmission of a channel sounding signal and provides an antenna selection signal to the antenna switch 203. Also, the baseband modem 201 outputs a data signal and a channel sounding signal, which are to be transmitted to the base station, to the antenna switch 203 during an uplink period, and receives a data signal from the base station through the first switch 205 and the second switch 207 during a downlink period.

Based on the TDD scheme, the antenna switch 203 outputs the data signal, which is received from the baseband modem 201, to the first switch 205 during the uplink period. Also, in response to the antenna selection signal received from the baseband modem 201, the antenna switch 203 outputs the channel sounding signal, which is received from the baseband modem 201, to the switch 205 or 207 connected to the corresponding antenna. In another embodiment, in response to the antenna selection signal received from the baseband modem 201, the antenna switch 203 may output the data signal, which is received from the baseband modem 201, to the switch 205 or 207 connected to the corresponding antenna.

The first switch 205 outputs a signal received from the antenna switch 203 to the first antenna 209, and outputs a signal received from the first antenna 209 to the baseband modem 201.

Likewise, the second switch 207 outputs a signal received from the antenna switch 203 to the second antenna 211, and outputs a signal received from the second antenna 211 to the baseband modem 201.

Figure 3:
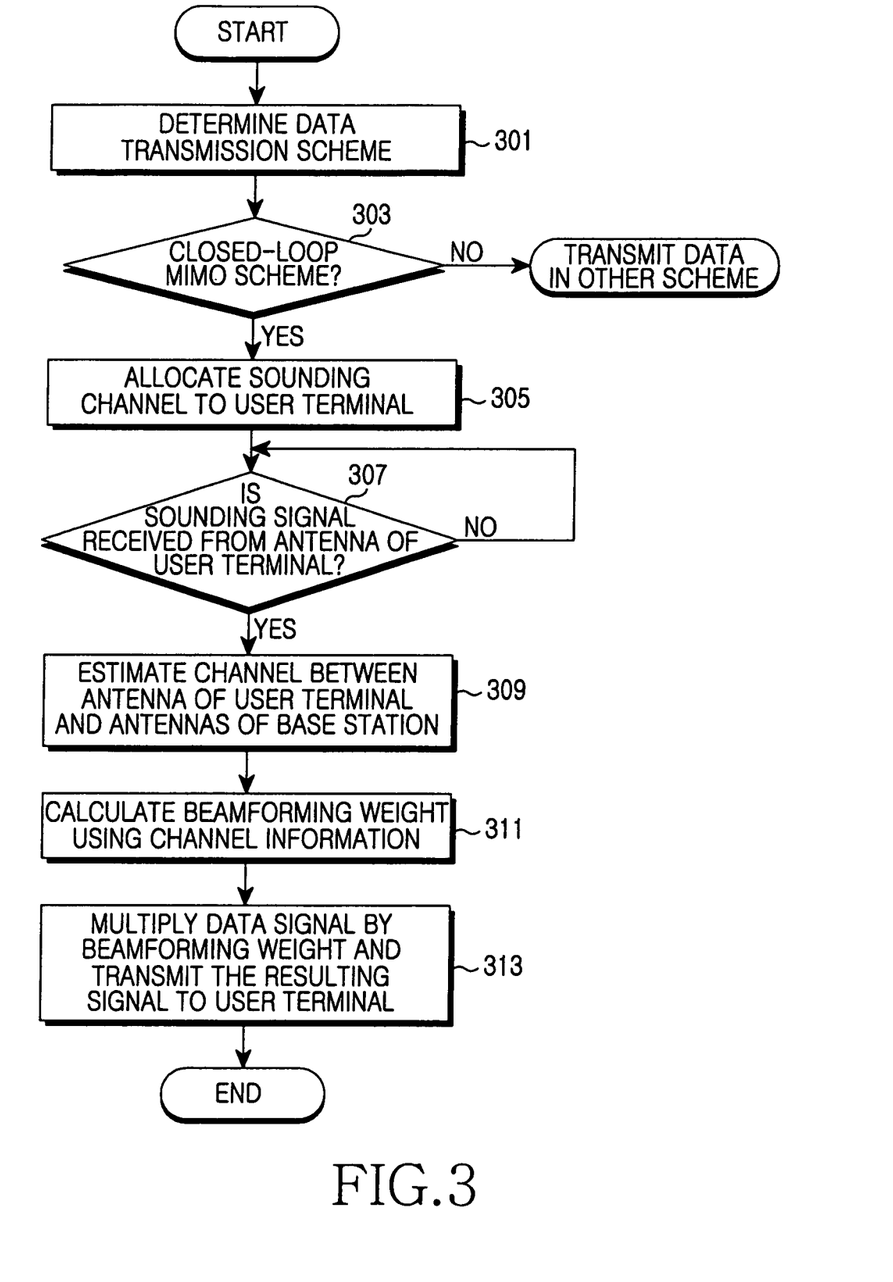
FIG. 3 is a flowchart illustrating a process for performing a beamforming operation of a base station on the basis of a channel sounding signal in the multiple antenna system according to an embodiment of the present invention.

FIG. 3 is a flowchart illustrating a process for performing a beamforming operation of a base station on the basis of a channel sounding signal in the multiple antenna system according to an embodiment of the present invention.

Referring to FIG. 3, the base station determines a data transmission scheme in step 301. For example, the base station determines whether to use a closed-loop MIMO scheme or an open-loop MIMO scheme. Herein, the user terminal may determine the data transmission scheme and request the base station to use the determined data transmission scheme. Alternatively, the base station may determine the data transmission scheme on the basis of feedback information received from the user terminal.

In step 303, the base station determines whether a closed-loop MIMO scheme is selected as the data transmission scheme. If a closed-loop MIMO scheme is not selected as the data transmission scheme, the base station transmits data in other data transmission scheme. On the other hand, if a closed-loop MIMO scheme is selected as the data transmission scheme, the base station allocates a sounding channel to user terminals located in a service area, in step 305.

In step 307, the base station determines whether a channel sounding signal is received from the user terminals over the sounding channel. Herein, the user terminals transmit the channel sounding signal using the antenna with the highest RX signal power among the antennas of the user terminals.

If the channel sounding signal is received from the user terminals, the base station estimates a channel between the channel sounding transmitting antenna of each user terminal and the antennas of the base station by using the received channel sounding signal, in step 309. In step 311, the base station calculates a beamforming weight for each user terminal using channel by using the channel information of the user terminal obtained through the channel estimation. Herein, the base station calculates the beamforming weight $w_i$ for each user terminal by using Equation 2:

$$w_i = \frac{h_i^*}{\|h_i\|} \quad \text{[Eqn. 2]}$$

where $h_i$ denotes the channel information of the $i^{th}$ antenna of the user terminal obtained through the channel estimation and * denotes a complex conjugate transpose.

Herein, the division of $h_i^*$ by $\|h_i\|$ in Equation (2) is to normalize the beamforming weight $w_i$ to a unit norm, thereby preventing a power increase due to beamforming.

In step 313, the base station multiplies a TX data signal by the calculated beamforming weight and transmits the resulting signal to the user terminal through the antennas. Thereafter, the base station ends the process.

In order to use a beamforming technique as a preceding technique in the multiple antenna system, the above-described embodiment generates the beamforming weight using the channel information of each user terminal. However, when other preceding technique is used in the multiple antenna system, the base station calculates a preceding matrix using the channel information of each user terminal and precodes a TX signal using the preceding matrix.

Also, when there is a plurality of user terminals in the service area, the base station estimates a channel using the channel sounding signal received from the user terminals, and performs a scheduling operation using the channel information obtained through the channel information, thereby selecting the user terminals to be provided with a service. Herein, the base station performs the scheduling operation using Equation 1.

Figure 4:
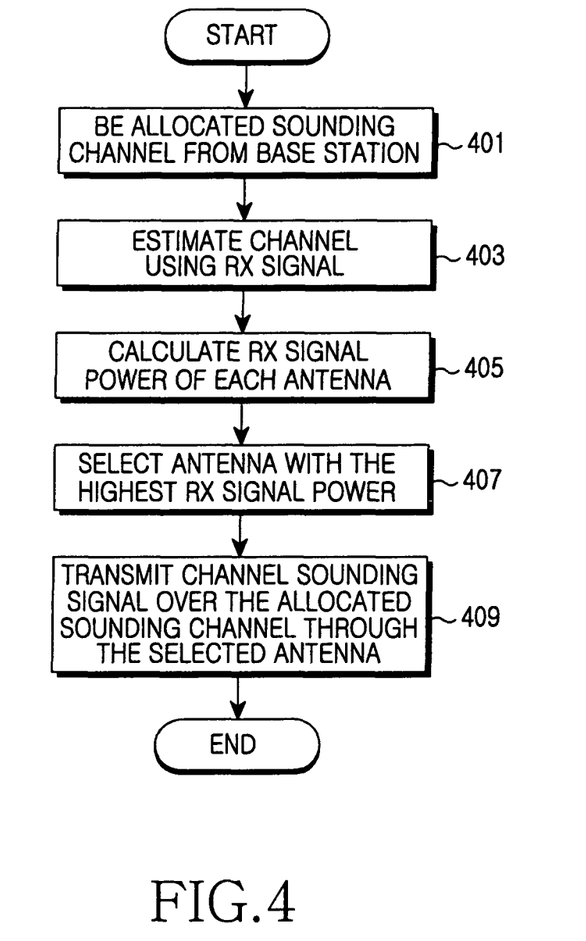
FIG. 4 is a flowchart illustrating a process for transmitting a channel sounding signal from a user terminal in the multiple antenna system according to an embodiment of the present invention.

FIG. 4 is a flowchart illustrating a process for transmitting a channel sounding signal from a user terminal in the multiple antenna system according to an embodiment of the present invention.

Referring to FIG. 4, the user terminal is allocated a sounding channel from a base station in step 401. In step 403, the user terminal estimates a channel using a downlink signal received from the base station through each antenna. For example, the user terminal estimates the channel using a pilot signal included in the downlink signal.

In step 405, the user terminal calculates the RX signal power of each antenna using the channel information obtained through the channel estimation. In step 407, the user terminal selects an antenna with the highest RX signal power (e.g., the highest SNR) among its antennas. Herein, the user terminal selects the antenna using Equation 3:

$$k = \mathop{\arg\min}_{i=1,\ldots,M_r} \|Hw_i\|^2 = \mathop{\arg\min}_{i=1,\ldots,M_r} \frac{\|Hh_i^*\|^2}{\|h_i\|^2}. \quad \text{[Eqn. 3]}$$

Herein, the user terminal obtains information about a $1 \times N_t$ channel row vector $h_i$ corresponding to the $i^{th}$ antenna of the user terminal by using an $M_r \times M_t$ channel matrix H of the downlink, and calculates the beamforming weight $w_i$ of the $i^{th}$ antenna by using the channel information $h_i$ of the $i^{th}$ antenna as Equation 2. Herein, the user terminal calculates the RX signal power $\|Hw_i\|^2$ of the $i^{th}$ antenna by using the channel matrix H and the beamforming weight $w_i$ of the $i^{th}$ antenna. Thus, the user terminal antenna with the highest RX signal power can be selected by comparing the RX signal power levels of all the user terminal antennas.

In step 409, the user terminal transmits a channel sounding signal to the base station through the selected antenna. Herein, the channel sounding signal is transmitted to the base station over the sounding channel allocated from the base station. Thereafter, the user terminal ends the process.

As described above, in the TDD multiple antenna system, the user terminal compares the power levels of signals received through the respective antennas and transmits the channel sounding signal through the antenna with the highest RX signal power. Therefore, the signal reception performance of the user terminal can be enhanced through an antenna selection scheme with low complexity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a channel sounding signal from a user terminal in a multiple antenna system, the method comprising:

estimating a channel for each of a plurality of antennas in the user terminal;

calculating a receiving (RX) signal power of each of the antennas by using a channel matrix of a downlink and a beamforming weight based on channel information obtained through the channel estimation;

selecting an antenna to transmit the channel sounding signal to a base station based on the calculated RX signal power of each of the antennas, the selected antenna having a highest RX signal power among the antennas; and transmitting the channel sounding signal to the base station through the selected antenna, wherein the antenna with the highest RX signal power is selected using the following equation:

$$k = \mathop{\arg\max}_{i=1,\ldots,M_r} \|Hw_i\|^2$$

where $M_r$ denotes a total number of antennas of the user terminal, $w_i$ denotes the beamforming weight of an $i^{th}$ antenna, H denotes the channel matrix, and $\|Hw_i\|^2$ denotes the RX signal power of the $i^{th}$ antenna which is calculated using the channel matrix H and the beamforming weight $w_i$ of the $i^{th}$ antenna.

2. The method of claim 1, further comprising allocating a sounding channel for transmission of the channel sounding signal from the base station.

3. The method of claim 1, wherein the beamforming weight is calculated using the following equation:

$$w_i = \frac{h_i^*}{\|h_i\|}$$

where $h_i$ denotes the channel information of the $i^{th}$ antenna obtained through the channel estimation and * denotes a complex conjugate transpose.

4. The method of claim 1, wherein the channel is estimated using a pilot signal included in a downlink signal.

5. An apparatus for transmitting a channel sounding signal from a user terminal in a multiple antenna system, the apparatus comprising:

a channel estimator configured to estimate a channel for each of a plurality of antennas in the user terminal;

a receiving (RX) signal power calculator configured to calculate a RX signal power of each of the antennas by using a channel matrix of a downlink and a beamforming weight based on channel information obtained through the channel estimation;

an antenna selector configured to select an antenna to transmit the channel sounding signal to a base station based on the calculated RX signal power of each of the antennas, the selected antenna having a highest RX signal power among the antennas; and a transmitting TX/RX switch configured to transmit the channel sounding signal to the base station through the selected antenna, wherein the antenna selector is configured to select the antenna using the following equation:

$$k = \underset{i = 1, \ldots, M_r}{\arg\max} \|Hw_i\|^2$$

where $M_r$ denotes a total number of antennas of the user terminal, $w_i$ denotes the beamforming weight of an $i^{th}$ antenna, H denotes the channel matrix, and $\|Hw_i\|^2$ denotes the RX signal power of the $i^{th}$ antenna which is calculated using the channel matrix H and the beamforming weight $w_i$ of the $i^{th}$ antenna.

6. The apparatus of claim 5, wherein the TX/RX switch transmits the channel sounding signal over a sounding channel allocated by the base station.

7. The apparatus of claim 5, wherein the TX/RX switch comprises:

an antenna switch configured to output a data signal received from a baseband modem to a switch connected to the antenna for transmission and reception of the data signal, and output the channel sounding signal received from the baseband modem to the switch connected to the selected antenna; and switches for the respective antennas configured to output a signal received from the antenna switch to a connected antenna, and output the signal from the connected antenna to the baseband modem.

8. The apparatus of claim 5, wherein the beamforming weight is calculated using the following equation:

$$w_i = \frac{h_i^*}{\|h_i\|}$$

where $h_i$ denotes the channel information of the $i^{th}$ antenna obtained through the channel estimation and * denotes a complex conjugate transpose.

9. The apparatus of claim 5, wherein the channel estimator estimates the channel using a pilot signal included in a downlink signal.

10. A method for transmitting a channel sounding signal from a user terminal in a multiple antenna system, the method comprising:

estimating a channel for each of a plurality of antennas in the user terminal using a downlink signal received using the each antenna;

calculating a receiving (RX) signal power of each of the antennas by using a channel matrix of a downlink and a beamforming weight based on channel information obtained through the channel estimation;

selecting an antenna to transmit the channel sounding signal to a base station based on the calculated RX signal power of each of the antennas, the selected antenna having a highest RX signal power among the antennas; and transmitting the channel sounding signal to the base station through the selected antenna, wherein the antenna with the highest RX signal power is selected using the following equation:

$$k = \underset{i = 1, \ldots, M_r}{\arg\max} \|Hw_i\|^2$$

where $M_r$ denotes a total number of antennas of the user terminal, $w_i$ denotes the beamforming weight of an $i^{th}$ antenna, H denotes the channel matrix, and $\|Hw_i\|^2$ denotes the RX signal power of the $i^{th}$ antenna which is calculated using the channel matrix H and the beamforming weight $w_i$ of the $i^{th}$ antenna.

11. The method of claim 10, further comprising allocating a sounding channel for transmission of the channel sounding signal from the base station.

12. The method of claim 10, wherein the beamforming weight is calculated using the following equation:

$$w_i = \frac{h_i^*}{\|h_i\|}$$

where $h_i$ denotes the channel information of the $i^{th}$ antenna obtained through the channel estimation and * denotes a complex conjugate transpose.

13. The method of claim 10, wherein the downlink signal comprises a pilot signal.

14. An apparatus for transmitting a channel sounding signal from a user terminal in a multiple antenna system, the apparatus comprising:

a channel estimator configured to estimate a channel for each of a plurality of antennas in the user terminal using a downlink signal received using the each antenna;

a receiving (RX) signal power calculator configured to calculate a RX signal power of each of the antennas by using a channel matrix of a downlink and a beamforming weight based on channel information obtained through the channel estimation;

an antenna selector configured to select an antenna to transmit the channel sounding signal to a base station based on the calculated RX signal power of each of the antennas, the selected antenna having a highest RX signal power among the antennas; and a transmitting TX/RX switch configured to transmit the channel sounding signal to the base station through the selected antenna, wherein the antenna selector is configured to select the antenna using the following equation:

$$k = \underset{i = 1, \ldots, M_r}{\arg\max} \|Hw_i\|^2$$

where $M_r$ denotes a total number of antennas of the user terminal, $w_i$ denotes the beamforming weight of an $i^{th}$ antenna, H denotes the channel matrix, and $\|Hw_i\|^2$ denotes the RX signal power of the $i^{th}$ antenna which is calculated using the channel matrix H and the beamforming weight $w_i$ of the $i^{th}$ antenna.

15. The apparatus of claim 14, wherein the TX/RX switch transmits the channel sounding signal over a sounding channel allocated by the base station.

16. The apparatus of claim 14, wherein the TX/RX switch comprises:

an antenna switch configured to output a data signal received from a baseband modem to a switch connected to the antenna for transmission and reception of the data signal, and output the channel sounding signal received from the baseband modem to the switch connected to the selected antenna; and switches for the respective antennas configured to output a signal received from the antenna switch to a connected antenna, and output the signal from the connected antenna to the baseband modem.

17. The apparatus of claim 14, wherein the beamforming weight is calculated using the following equation:

$$w_i = \frac{h_i^*}{\|h_i\|}$$

where $h_i$ denotes the channel information of the $i^{th}$ antenna obtained through the channel estimation and * denotes a complex conjugate transpose.

18. The method of claim 1, wherein selecting the antenna to transmit the channel sounding signal to the base station comprises:

selecting a single antenna with the highest RX signal power from the plurality of antennas as the antenna to transmit the channel sounding signal to the base station.

19. The apparatus of claim 14, wherein to select the antenna to transmit the channel sounding signal to the base station, the antenna selector is further configured to select a single antenna with the highest RX signal power from the plurality of antennas as the antenna to transmit the channel sounding signal to the base station.

20. The apparatus of claim 5, wherein to select the antenna to transmit the channel sounding signal to the base station, the antenna selector is further configured to select a single antenna with the highest RX signal power from the plurality of antennas as the antenna to transmit the channel sounding signal to the base station.

21. The method of claim 10, wherein selecting the antenna to transmit the channel sounding signal to the base station comprises:

selecting a single antenna with the highest RX signal power from the plurality of antennas as the antenna to transmit the channel sounding signal to the base station.

* * * * *